(12) United States Patent
Gianutsos et al.

(10) Patent No.: US 9,930,344 B2
(45) Date of Patent: Mar. 27, 2018

(54) DIGITAL CONTENT INTEGRATION AND DELIVERY SYSTEM AND METHOD

(75) Inventors: John Christopher Gianutsos, New York, NY (US); Tyler John Knight, La Canada Flintridge, CA (US); Harvey Landy, Simi Valley, CA (US); David C. Pugh, New York, NY (US)

(73) Assignee: NBCUNIVERSAL MEDIA, LLC, Wilmington, DE (US)

( * ) Notice: Subject to any disclaimer, the term of this patent is extended or adjusted under 35 U.S.C. 154(b) by 1795 days.

(21) Appl. No.: 12/539,128

(22) Filed: Aug. 11, 2009

(65) Prior Publication Data
US 2011/0038611 A1 Feb. 17, 2011

(51) Int. Cl.
| | |
|---|---|
| H04N 9/80 | (2006.01) |
| H04N 19/17 | (2014.01) |
| G06Q 30/06 | (2012.01) |
| G06Q 50/18 | (2012.01) |
| H04N 7/173 | (2011.01) |
| H04N 21/2343 | (2011.01) |
| H04N 21/2662 | (2011.01) |
| H04N 21/414 | (2011.01) |

(Continued)

(52) U.S. Cl.
CPC ......... H04N 19/17 (2014.11); G06Q 30/0607 (2013.01); G06Q 50/184 (2013.01); H04N 7/17336 (2013.01); H04N 21/23439 (2013.01); H04N 21/234363 (2013.01); H04N 21/234372 (2013.01); H04N 21/2662 (2013.01); H04N 21/41415 (2013.01); H04N 21/472 (2013.01); H04N 21/47815 (2013.01); H04N 21/6581 (2013.01)

(58) Field of Classification Search
USPC .................................................. 386/248, 262
See application file for complete search history.

(56) References Cited

U.S. PATENT DOCUMENTS

| | | |
|---|---|---|
| 5,926,613 A | 7/1999 | Schaffer |
| 6,728,317 B1 | 4/2004 | Demos |

(Continued)

OTHER PUBLICATIONS

International Search Report & Written Opinion for PCT Application No. PCT/US2010/042074; dated Oct. 20, 2010.

(Continued)

*Primary Examiner* — Nigar Chowdhury
(74) *Attorney, Agent, or Firm* — Fletcher Yoder PC (57) ABSTRACT

Digital content, such as movies, television productions, and the like are processed and delivered based upon digital masters. The masters may be produced as the initial content, or any other content may be digitized to create the masters. An HD full aperture version is used to create a reduced set of masters that can be used to fill orders having a wide range of features and options. The HD full aperture version is combined with pan and scanned instructions parsed from original pan and scan files to permit automatic creation of the basic masters used to fill the orders, such as a letter box version, a 16:9 FF version, and a 4:3 FF version. The derived masters may be HD versions or SD versions. Upon receipt of orders, the proper version is selected and assembled with any other components that may be ordered by the customer. Ingestion of the masters may be delayed until order reception, and transcoding of the original master may also be delayed until order reception.

21 Claims, 6 Drawing Sheets

(51) Int. Cl.
*H04N 21/472* (2011.01)
*H04N 21/478* (2011.01)
*H04N 21/658* (2011.01)

(56) References Cited

U.S. PATENT DOCUMENTS

| | | | |
|---|---|---|---|
| 7,606,925 B2 * | 10/2009 | Sheldon | H04L 29/06 709/231 |
| 2003/0236716 A1 * | 12/2003 | Manico | G06Q 30/0601 705/500 |
| 2004/0212731 A1 | 10/2004 | Sie et al. | |
| 2004/0223745 A1 * | 11/2004 | Sawabe et al. | 386/96 |
| 2005/0091681 A1 * | 4/2005 | Borden | G11B 20/00086 725/31 |
| 2005/0198115 A1 * | 9/2005 | Sugimoto et al. | 709/203 |
| 2006/0092324 A1 * | 5/2006 | Morishige | H04N 7/0122 348/556 |
| 2007/0061862 A1 | 3/2007 | Berger et al. | |
| 2007/0150592 A1 * | 6/2007 | Bell | G06F 1/28 709/226 |
| 2008/0123138 A1 * | 5/2008 | Banerjee | H04N 1/00132 358/1.18 |
| 2008/0163071 A1 * | 7/2008 | Abbott | G06Q 30/02 715/748 |
| 2009/0043674 A1 * | 2/2009 | Minsky | G06Q 30/0603 705/26.8 |
| 2010/0097443 A1 * | 4/2010 | Lablans | G03B 37/00 348/36 |
| 2010/0131993 A1 * | 5/2010 | Sanitate et al. | 725/91 |

OTHER PUBLICATIONS

Feng Liu, Michael Gleicher; "Video Retargeting: Automating Pan and Scan"; Proceedings of the 14th Annual ACM International Conference on Multimedia; Oct. 23, 2006; pp. 241-250, XP002605061, Santa Barbara (CA, USA).

* cited by examiner

Order Manager

| Order Info ▲ | Title Search ▲ | Product Selection ▲ | Source Material ▲ | Shipping & Billing ▲ | Review & Submit |

*Product Type: [Distribution ▾]
*Element Category: [Video ▾]
*Order Spec Template: [Video Distribution – Blank Template ▾]

Additional Options ☐ Attributes

*Element Type: [Distribution Copy ▾]            *Textless: [Textless At End ▾]
*Element Subcategory: [Tape ▾]                  *Language: [English ▾]
*Type: [Dual Lang Mstr ▾]                       *Color/Balck & White: [Color ▾]
Sub Type: [Added Scenes ▾]                      *Analog/Digital: [Digital ▾]
*Video Standard: [HD 1080/24p ▾]                *Timecode Type: [NDFTC ▾]
*Stock Type: [DVC-Pro HD ▾]                     Bit Rate: [24 Bit ▾]
*Display Aspect Ratio: [2:40 ▾]                 Conversion Type: [                ▾]
*Format: [16x9 Letterbox ▾]                     [Added Region Code]
*Texted: [Texted ▾]                             [Add VITC]

Done

FIG. 9

| Order Manager | | | | | Gianutsos, John |
|---|---|---|---|---|---|
| New Order | Search Orders | Queues | Orders | POs | |

Order Info ▲ Title Search ▲ Product Selection ▲ Source Material ▲ Shipping & Billing ▲ Review & Submit

TITLE (MAKE)

| ◆ Title | ◆ Episode Title | ◆ Season | ◆ Prod # | ◆ Version | ◆ Gauge | ◆ Standard | ◆ Format | ◆ Aspect Ratio |
|---|---|---|---|---|---|---|---|---|
| Title 5 | | | 02127 ▾ | Theatrical | DVC-Pro HD | DVC-Pro HD | 16x9 Letterbox | 2:40 |

INVENTORY TITLES (7/7 RECORDS)   □ Bypass SGEN Filter

| ◆ Title | ◆ Episode / Description | ◆ Production Number | ◆ Season Code | ◆ # of Elements | ◆ Version |
|---|---|---|---|---|---|
| Title | Theatrical | | | 1462 | Theatrical Version |
| Title 1 | NETWORK (LONG) | | LIO | 153 | Network Long Versio |
| Title 1 | NETWORK (SHORT) | | LIO | 45 | Turner Network Vers |

INVENTORY SOURCE MATERIAL ELEMENTS (250 / 1462 RECORDS)

| ◆ Title | ◆ Episode Title | ◆ Producton Number | ◆ Version | ◆ Season Code | ◆ Season Year | ◆ Run Mins. |
|---|---|---|---|---|---|---|
| 📎 Title 5 | THEATRICAL | 02127 | THEAT | | 0 | 0 |
| 📎 Title 5 | THEATRICAL | 02127 | THEAT | | 0 | 0 |
| 📎 Title 5 | THEATRICAL | 02127 | THEAT | | 0 | 0 |
| 📎 Title 5 | THEATRICAL | 02127 | THEAT | | 0 | 0 |
| 📎 Title 5 | THEATRICAL | 02127 | THEAT | | 0 | 0 |

Done

DIGITAL CONTENT INTEGRATION AND DELIVERY SYSTEM AND METHOD

BACKGROUND OF THE INVENTION

The present invention relates generally to the field of digital content preparation and delivery systems, and more particularly to improved techniques for preparing and distributing digitized movies, audiovisual programs, and the like that reduces memory utilization and complexity.

A wide range of techniques have been developed for preparation and delivery of digital content, such as movies, audiovisual materials, and so forth. Historically, such materials were prepared on film which was used to create a master copy. The master copy would be made up of segments of film that were cut and spliced together and eventually combined with a sound track to create the master. The master could then be copied to create a number of distribution copies. These would, in turn, be circulated to cinemas, television networks and other locations where distributors could arrange for viewing by the public. Various additional materials could be provided, such as news reels, advertisements, previews, and the like, and these were typically provided as separate materials that could be added to the distributed copies either at the cinemas or prior to distribution.

With the advent of digital content, these preparation techniques and distribution schemes have changed considerably. For example, digital masters may be prepared, although in many contexts legacy materials still rely upon the original film-based masters. Even when digital masters are used, a great number of variants may be required to enable a studio or other content provider to respond to the variety of orders that may be received. For example, the master may be adapted for different viewing formats that accommodate different replay technologies. This alone increases greatly the number of copies and the resulting storage space required. The same content may, then, be made available in different languages, with and without sub-titles, with and without advertising content or previews, and so forth. In conventional distribution techniques, each of these various possibilities may lead to a separate copy that is pre-formatted, assembled, and stored. In many contexts, once an order is received for specific content, the content may also be loaded onto film or video tape which is distributed in the conventional manner. Even where film or video tape is not used, however, a great number of copies of the same content are often created and stored, resulting in a large amount of memory utilization requiring vast storage capabilities.

There is a need in the field for an improved digital content processing technique that can substantially reduce the complexity of this process and the amount of electronic storage media required. There is a particular need for a technique that can allow for a quick response to orders, while nevertheless providing the wide range of product offerings available through conventional techniques.

BRIEF DESCRIPTION OF THE INVENTION

The present invention provides a technique for creating digital content in multiple formats and with multiple options designed to respond to these needs. The technique may be used with any suitable content, but is particularly well-suited to audio-visual content, such as television programs, movies, advertising content, and so forth. The technique significantly reduces the amount of electronic memory required, while still enabling the very large range of options to be offered as with conventional digital content distribution. The technique may accommodate conventional film distribution as the end result, but reaches this stage in a vastly improved manner through a great reduction in electronic storage needs. Alternatively, the technique can produce electronic versions that can be distributed by any suitable electronic distribution means (typically over the Internet).

In accordance with certain aspects of the present techniques, a method is provided for processing audiovisual content. A digital master version of the audiovisual content is first processed to generate a plurality of master versions based upon the output of the post production mastering workflow. The digital master version may be a high definition full aperture version of the content. By utilizing pan and scan instructions, the master versions may include a letterbox version, a 16:9 full frame version, and a 4:3 full frame version. These master versions serve as a limited set of versions from which orders for the content may be filled. The master versions are stored, and upon receipt of an order for a packaged version of the content, one of the plurality of master versions is selected based upon the order, and the selected master version is assembled with additional content based upon the order.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
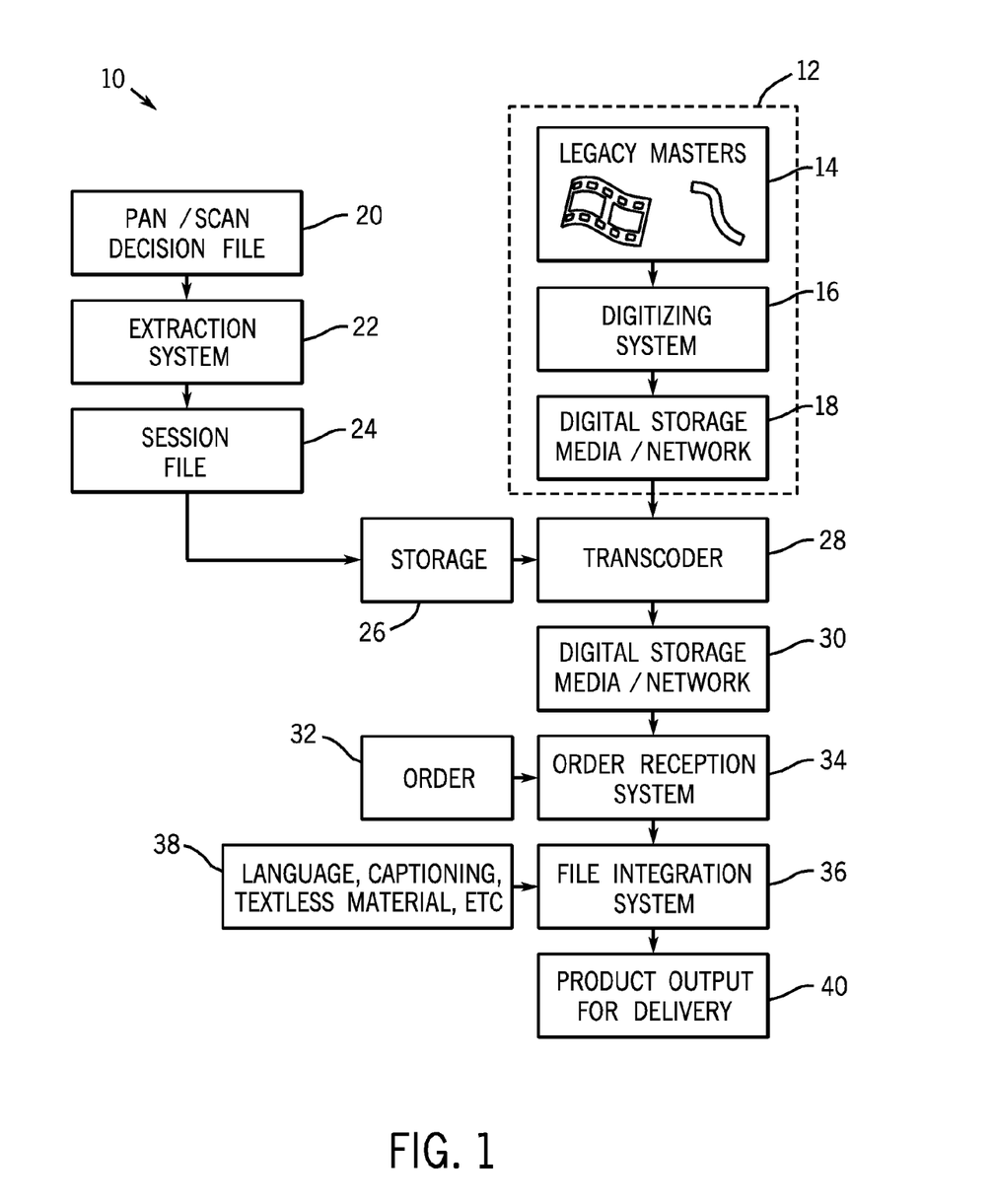
FIG. 1 is a diagrammatical overview of a digital content processing and delivery system in accordance with aspects of the present techniques.

Turning now to the drawings, FIG. 1 is a diagrammatical representation of a digital content processing and distribution system in accordance with aspects of the present technique. The system is particularly well-suited to the processing and distribution of audio visual materials, such as movies, television episodes and content, educational content, publicity, and so forth. The illustrated system includes a master capture system 12 which is sometimes referred to herein as carrying out the "ingest" process. In particular, because virtually all legacy audio visual content is captured, created and stored on physical media such as film and video tape, the operations performed by system 12 allow for creation of digital masters that will be used before further processing and distribution. While the system can, of course, accommodate content that is digitally created, to accommodate the vast array of product offerings by movie studios, television networks, and other creative sources, the system 12 allows for creation of a main digital master from which other electronic versions of the content can be produced in an efficient manner. As illustrated, system 12 includes the original legacy masters 14. It should be understood, however, that these masters may include recent, current and even future masters that are created and stored on conventional physical media such as film and video tape. A digitizing system 16 is provided for creating electronic versions of the masters. The digitizing system 16 essentially breaks the images and sound contained on the masters into an electronic (e.g., binary) format by pixellating images and digitally recording sound. The digitizing system 16 may be automated or may employ technicians, such as for remixing, enhancing, filtering and improving image quality, colorizing, and so forth. Following digitization of the masters, the newly-created digital masters are stored in digital storage media or networks. A number of suitable media are known and currently used in the industry, such as storage area networks, tape storage devices, optical storage devices, and the like.

As discussed in greater detail below, several approaches may be envisaged for ingesting the original material into the digital processing system presently contemplated. For example, a studio or other content provider with a large number of masters may undertake to digitize some or all of these prior to receiving actual orders for digital copies. The entire library or collection, or at least the most commercially active selections from the library may thus be converted and stored as digital masters as summarized above. On the other hand, it is also contemplated that this ingestion process may be performed on an ongoing basis as orders for the materials are received. This could allow the system to avoid handling the vast quantities of legacy offerings, and extend the eventual full digitization of legacy masters over a period of years. It is believed, however, that due to the increasingly fragile nature of the physical media, it will become increasingly attractive to use such ingestion processes to create a digital library corresponding to the original masters.

As will be appreciated by those skilled in the art, when audiovisual content is generated, such as by a movie or television studio, many scenes and takes may be captured that ultimately serve as the basis for creating a master. During the production and post-production handling of the materials, then, decisions are made as to which scenes, portions of scenes, particular takes, and so forth will be included in the final product. Indeed, several final products may be made for different purposes, and scenes may be stored for inclusion in abbreviated or full versions, alternative versions, and the like.

Similarly, even within scenes that are retained for inclusion in the product offering, only certain portions of the full field of view may be utilized. By way of example, the full field of view version of the content may include elements that were inadvertently captured and that are not desired in the final product, such as microphones, booms, edges of sets, persons peripheral to the production scene, and so forth. In typical post-production, then, pan and scan decisions are made that further refine the full field of view master by moving the useful field of view to only a portion of the full field of view, select portion of the full field of view, perform close-ups or selections of certain portions of the scene, and so forth. This is particularly relevant as most material is shot in high definition but needs to be cropped to fit the display of an SD monitor. Thus, the most relevant portion of the screen is selected so as not to chop the most interesting portion of the scene out of the frame.

In current technologies, the full field of view version in a digitized format would typically consist of a high definition (HD) full aperture version. It is presently contemplated that this HD full aperture version will be stored in the digital storage media/network 18 for generation of a small set of masters that will be used for further processing and distribution. Also in accordance with current technologies, the pan and scan decisions made for the ultimate product used for distribution are stored in a file created by commercially available software packages. Such software is currently available, for example, from da Vinci Systems of Coral Springs, Fla. Generally, pan and scan decisions may accommodate different formats that can be derived from the HD full aperture version, depending upon the size of field of view, the size or sizes of the screen on which the content is intended to be presented, and so forth. Of particular interest for the present purposes are pan and scan decisions for three basic master formats, including a "letter box" version which is essentially a resized HD full aperture version, a 16:9 full frame (FF) version, and a 4:3 FF version. The original HD full aperture version may be captured in one of several resolutions, with resolutions available generally improving as the technology advances. The pan/scan decision file, represented generally by reference numeral 20 in FIG. 1, then, results from post-processing operations on the HD full aperture version that can be used to create the other versions of interest, and particularly those three summarized above.

In accordance with the present technique, decisions captured in the pan/scan decision file 20 are parsed to create a simplified file that can be referred to for later processing. In the illustrated embodiment, an extraction system 22 is used to perform this operation. In essence, this parsing evaluates the file 20 to extract pan and scan decisions for each frame of the various scenes in the digital content, and summarizes them in a tabulated form. The extraction system 22 may be performed by a suitable computer system executing code stored on memory. Any currently available suitable processor may be used to perform these operations, with workstations to permit interaction by a technician. Software for performing the extraction of the pan/scan decisions is available, for example, from Silk Software Corporation of Tustin, Calif. The output of the extraction system may be termed a "session" file, and includes the pan/scan decisions for each of the conversion masters of interest. This session file, indicated generally by reference numeral 24 in FIG. 1 is stored for later reference as indicated by reference numeral 26.

The stored digital masters, typically HD full aperture versions from the digital storage media/network 18 may then be combined with the session file information in storage 26 to create specific versions of the content that can be used for further processing and distribution. In the illustrated embodiment, this process is carried out by a transcoder 28. In general, the transcoder 28 will comprise one or more computers that are programmed to process the digital content by application of the decisions summarized in the session file. That is, each frame of the digital content, or individual scenes may be cropped or shifted, and operations may be performed such as using only a portion of each scene by moving or zooming the field of view. The transcoder may perform additional conventional operations to produce the masters of interest in a presently contemplated embodiment, as summarized in greater detail below, the HD full aperture version is used to create a letter box version, a 16:9 FF version, and a 4:3 FF version. The derivative versions may be HD versions, or may be created and stored in a standard definition (SD) format. As will be appreciated by those skilled in the art, the picture quality, sound quality and frame rates may be different for these versions, and the transcoding process performed by transcoder 28 may include re-sampling, frame rate conversion, and so forth. Following trans-coding, then, the newly-created masters are stored in digital storage media/network 30. In practice, the storage media indicated by reference numeral 30 may be the same media as indicated by reference numeral 18, or different media may be used, even at different physical locations.

While the present technique has been described above in the context of a high definition full aperture version used as a master, more generally, this version may be considered an "unsized" master version that may be processed to generate the other master versions that may be used to fill orders as they are received. This unsized version will typically be a full aperture version, but sized or cropped versions may also be used for this purpose. While in present technologies, high definition versions are particularly attractive for this purpose, future developments may make other formats useful for the primary digital unsized version. In general, the "unsized" version is a version that has not been cropped or to which pan and scan instructions have not been applied to generate the master versions used to fill orders. Similarly, the session file comprising the pan and scan instructions will typically be part of a larger instruction set that may also include, for example, certain other instructions, and metadata, such as file names, file paths, time codes and synchronization information, and so forth. As discussed herein, this instruction set may be stored separately or together with the content file and used to generate digital masters for filling orders either prior to order receipt, or at the time of receipt of orders. The files may also be "wrapped" or packaged together, or may be virtually hosted together, where desired.

The present techniques contemplate a greatly enhanced efficiency both for processing and of the use of digital storage by a vast reduction in the number of different versions that are created and stored. In particular, as will be appreciated by those skilled in the art, heretofore known digital content processing and distribution systems have created many different versions of different formats, including different options, content, and so forth. The options typically include items such as sub-titling, language selection, textless options (such as language explanations), and so forth. Existing systems created this cast array of product offerings in advance and stored each different offering for later selection and distribution. In the present technique, a greatly reduced set of converted versions will be used as created by the transcoder 28 based upon the pan and scan decisions. In particular, in an initial version of the technique, three principle versions may be relied upon, including the letter box version, the 16:9 FF version, and the 4:3 FF version. Orders, however, may be received for a wide range of packaged products. These may be, for example, different in compression (e.g., JPEG 2000), MXF wrapped files (video and audio), different file formats, files with different technical components, languages, subtitles, features, and so forth. In the present technique, these packaged products will be automatically generated upon receipt of orders.

In the illustration of FIG. 1, the order is represented by reference numeral 32. As discussed in greater detail below, the order would typically be placed by a customer of the content provider, such as a distribution company interacting with a movie or television studio. The order will be placed electronically, such as via templates provided over the Internet (see below FIGS. 7-9). Once the order is received by the order reception system 34, the order reception system will trigger production of the particular packaged product ordered. This will typically include selection of a title that designates the particular content (e.g., movie, television episode, audio/visual presentation, etc.). The order will also typically include a specification of the format, languages, any technical components desired, compression, and so forth. A file integration system 36, then, extracts the proper version from the masters stored in the digital storage media/network 30, and combines this version with those components specified in the order. These components will typically be stored as well, as indicated by reference numeral 38, and can be integrated into the packaged product in accordance with generally known techniques. The filled order is then packaged in a "wrapped" or assembled file and stored in a designated archival storage unit. The wrapped file may then be output for delivery as indicated by reference numeral 40 in FIG. 1. This may be performed in accordance with any suitable known technique, such as posting to a site, extracting from a site, high speed digital transmission, and the like. It should also be noted that product output may be in the form of video tape or film. If video tape or film is desired, the wrapped file is then converted to these physical media in accordance with known techniques. In an interim time, it is contemplated that the present technique will accommodate video and film storage, particularly for certain markets and countries where electronic transmission and presentation is in developmental stages.

Figure 2:
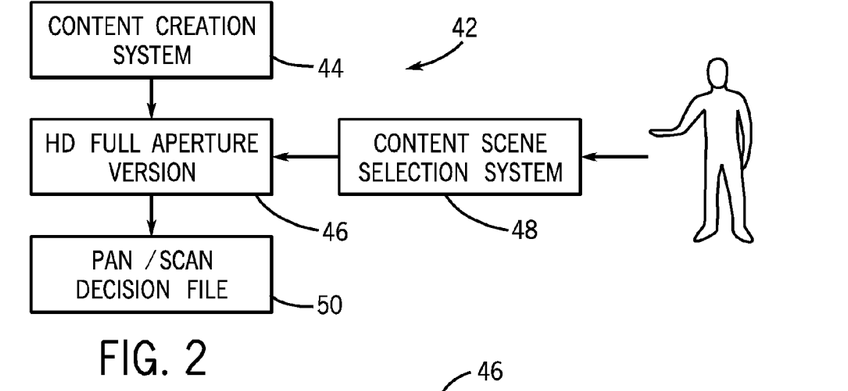
FIG. 2 is a diagrammatical overview of exemplary steps in generating a pan/scan decision file for use in the system of FIG. 1.

FIG. 2 illustrates exemplary steps for creating the pan/scan decision file summarized above. In the process, designated generally by reference numeral 42, content is created via a conventional content creation system 44. The content creation system will typically include cameras, such as any known film-based, videotape, digital, HD and other cameras, as well as audio capture equipment. The system also includes any post-production systems used to resample, filter, mix and remix, and so forth. In the post-production stages of the content, the HD full aperture version 46 is created. The full aperture version is then reviewed using a content scene selection system 48 with which an operator typically interfaces as indicated in FIG. 2. As noted above, such scene selection systems may include appropriately programmed computers and workstations running software specifically adapted for this purpose. The software available from da Vinci Systems may be used for this purpose. The process results in the pan/scan decision file 50 which essentially encodes the selections made by the technician. Again, these selections may include scene selections, field of view selections, close-ups, and so forth. Moreover, because the format of the versions created ultimately will be different, the decision file may include different decisions for different formats, thereby accommodating the presentation format available to the ultimate viewer.

Figure 3:
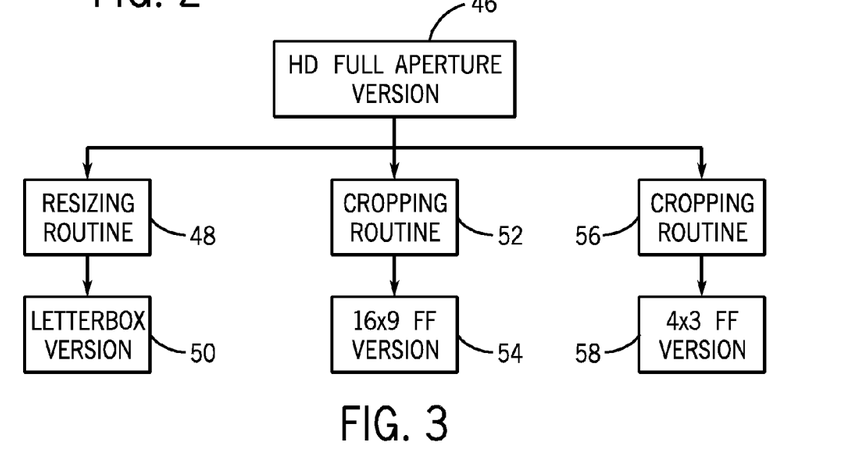
FIG. 3 is a diagrammatical overview of a reduced version set scheme for the system of claim 1 that permits significant reduction in storage capacity.

FIG. 3 is a diagrammatical layout of the conversion or transformation presently contemplated from the HD full aperture version 46. As illustrated in FIG. 3, the full aperture version 46 may be resized by a resizing routine 48 implemented in the transcoder 28 shown in FIG. 1. This resizing routine 48 creates the letter box version 50. A cropping routine 52 performed by the transcoder creates the 16:9 FF version 54. Again, this cropping routine will be based upon the pan/scan decision file. Similarly, a cropping routine 56 will be performed by the transcoder to create the 4:3 FF version 58. It is key that the transcoder can access the pan and scan decisions from the session file to automatically create these versions. In the present implementation, then, only one version is stored for further processing and distribution upon receipt of orders. This is the original HD full aperture version, and all other versions may be programmatically derived from this version. It should be understood, however, that different versions may be useful at later stages in the development of compression and digital content image processing technologies. Nevertheless, the ability to create and store this reduced set of versions is a very important improvement over heretofore known techniques which may have created 100 or more separate versions requiring separate storage and accessing for distribution.

Figure 4:
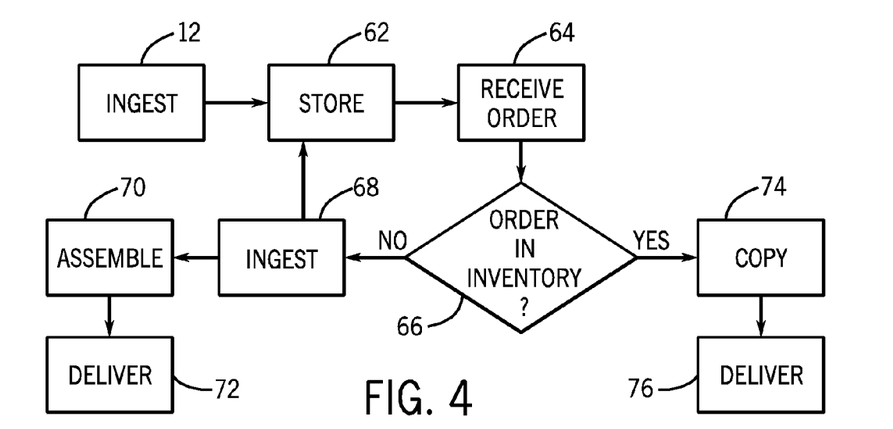
FIG. 4 is a diagrammatical overview of an alternative embodiment of for ingesting master content material and assembling the material for specific orders.

FIG. 4 is a diagrammatical representation of one embodiment for performing the processing an/or a completion outlined above. The process designated, designated generally by reference numeral 60, begins with ingesting the initial master content as summarized above. The ingested content is then stored as indicated at reference numeral 62, again, this will typically be performed at one or more storage locations on mass digital storage devices. Following storing of the masters, the provider will receive an order as indicated at reference numeral 64. Again, the order will typically specify the title, the format, and any technical or additional features that may be desired. Upon receipt of the order, the provider will exam its inventory of stored masters, or even assembled packaged products to determine whether the product requested is an inventory. If the product is not an inventory, the order management system can request that the original master be ingested as indicated at step 68. It should be noted that this processing is particular attractive insomuch as it does not require that all products for which orders may be received the initially ingested before the management system is placed in service. The process performed at step 68 may be essentially identical to that performed at step 12, but is specific to that product which has been ordered. The ingested master is then stored as would be any other ingested material, and may be trans-coded as indicated above to form the principle master versions of interest. Alternatively, the trans-coding process may be performed only on an as-ordered basis, with a library or inventory of versions being built overtime as they are ordered. At step 70, then, the packaged product is assembled, including any language options, subtitle options, textless options, and so forth as summarized above. Again, then at step 72, the packaged product may be delivered to the ordering customer. If at step 66 the order is found to be in the inventory, a copy of the ordered version is simply made as indicated at step 74 with assembly of the version with other options as before, followed by delivery of the packed product at step 76.

Figure 5:
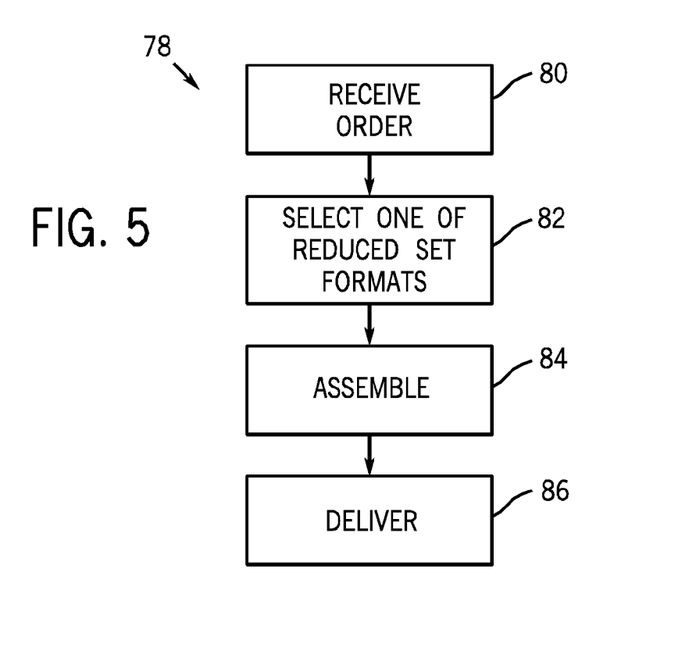
FIG. 5 is a diagrammatical overview of another alternative arrangement in which a reduced set of format versions may be used.
Figure 6:
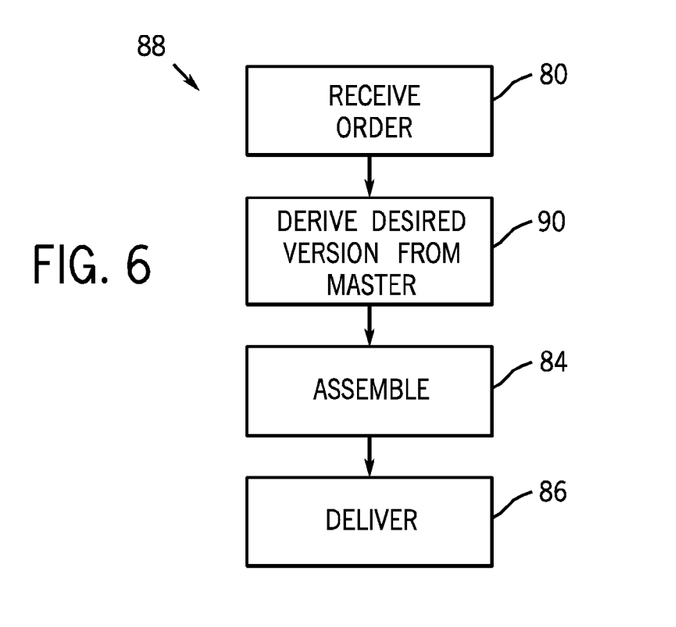
FIG. 6 is a diagrammatical overview of a further alternative embodiment in which assembly may be based upon a master version of the digital content.

It is presently contemplated that more fully developed processing in accordance with the present techniques may be performed in accordance with FIGS. 5 and 6. In particular, the processing of FIG. 5, designated generally by reference numeral 78, again begins with receipt of an order as indicated at step 80. At step 82, then, based upon the order received at step 80 one of the formats in a reduced set of masters is selected. As noted above, several formats or versions are presently contemplated, including a letter box version of the HD full frame, a 16:9 FF version and a 4:3 FF version. The process 78 is enabled by the pre-conversion of the HD full aperture version into the 3 key versions used as the basis for the product offerings. As noted above, this can be performed by a trans-coder based upon the pan and scan decisions in a session file or the equivalent. At step 84, then, this version is assembled with any other components selected in the order, again such as the technical components, languages, subtitles, textless features, and so forth. Finally, at step 86 the packaged product is delivered to the ordering customer.

The alternative processing summarized in FIG. 6, and designated by reference numeral 88, begins again with receipt of an order as indicated at step 80. In this processing, however, the conversion from the original HD full aperture is not performed until receipt of an order. Thus, at step 90 the desired version is derived from the original master, again based upon the pan and scan decisions contained in a session file or the equivalent. This processing, including the time-of-order transcoding, may further enhance the system insomuch as it requires still less electronic storage for the basic versions that will be used for the assembled products on an as-ordered basis. Once the desired version is converted from the master, then, the product is again assembled as indicated at step 84, and delivered at step 86 as before.

Figure 7:
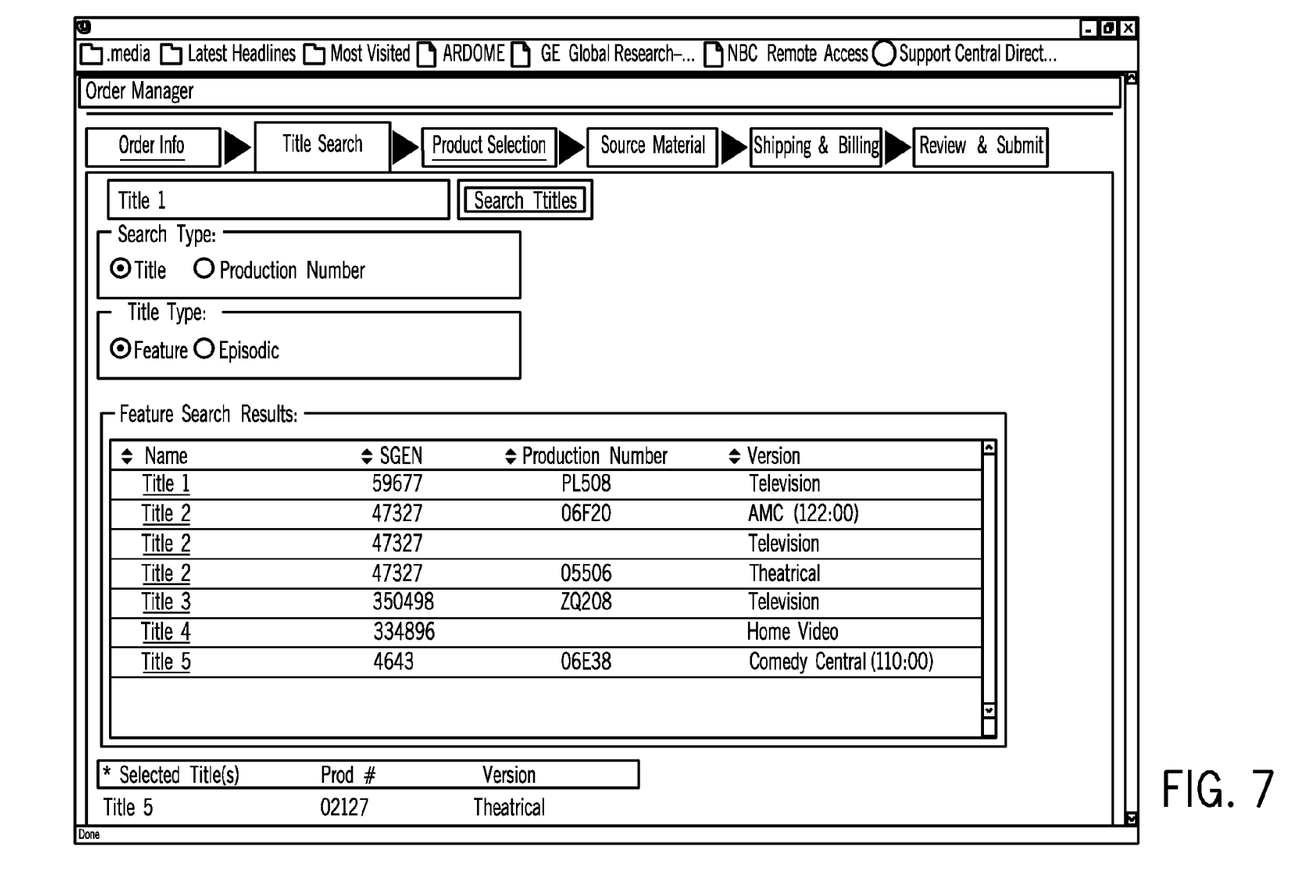
FIGS. 7-9 are exemplary interface screens for selection of desired digital content and options for the digital content that may be processed and assembled in accordance with the present techniques.
Figure 8:
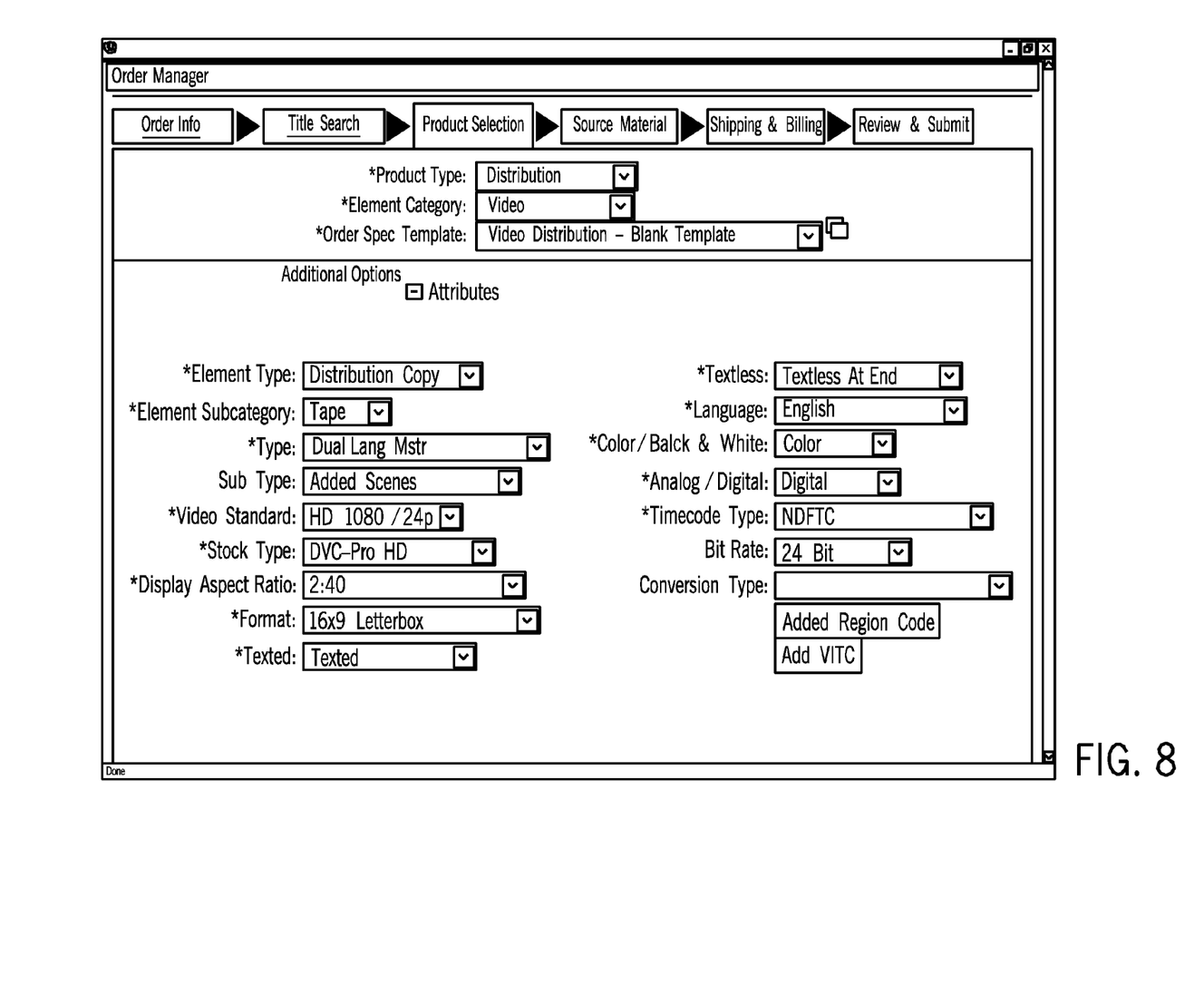
Figure 9:
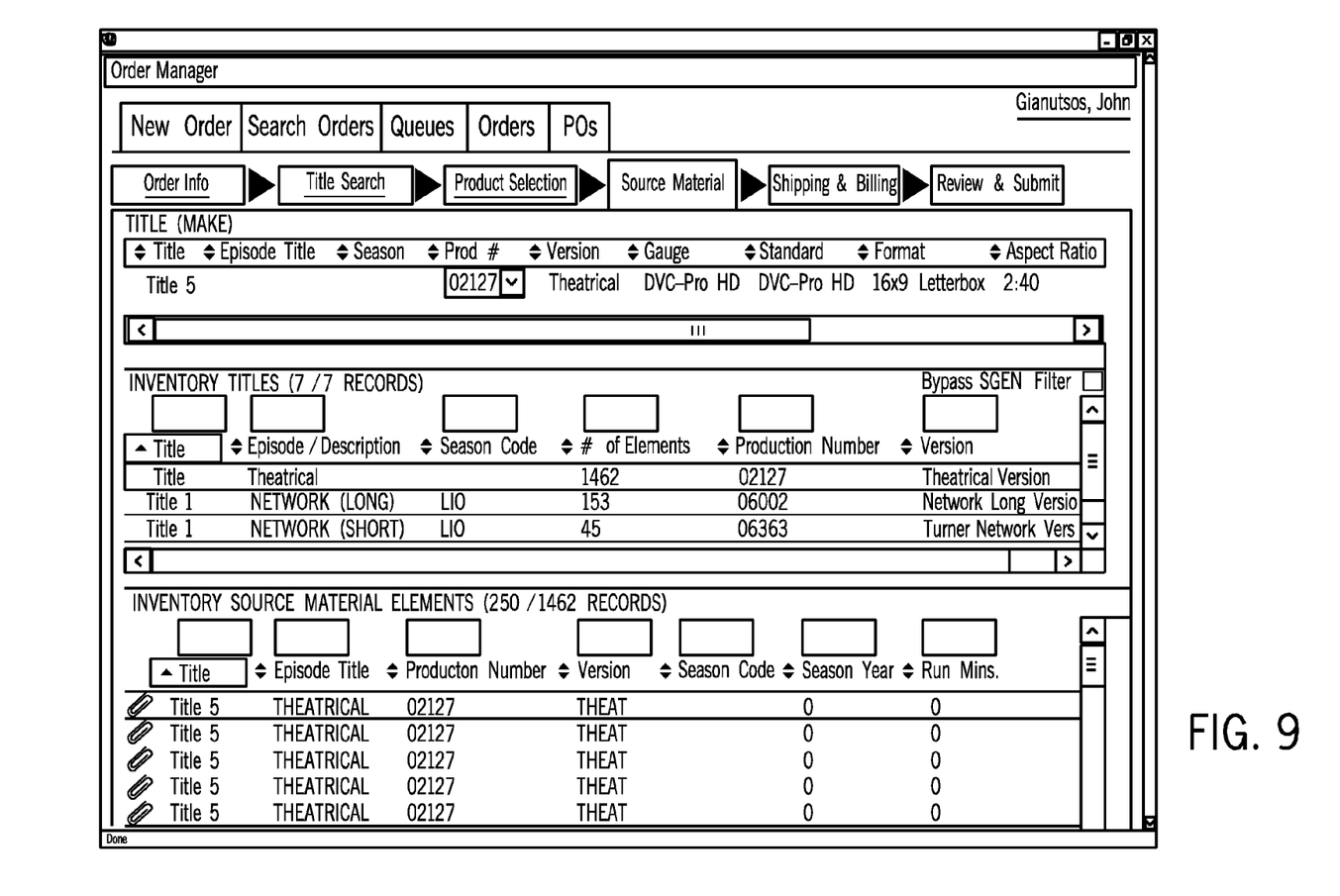

As noted above, various embodiments for the ordering interfaces may be envisaged. However, presently contemplated embodiments will be based upon a web-based order processing interface, exemplary pages of which are illustrated in FIGS. 7, 8 and 9. As shown in FIG. 7, an exemplary order page 92 may be presented to a user by a content provider. The user will visit a content provider website (or a distributor website) and may be prompted to input certain user access information, such as user name, password, account, and the like. Page 92, when presented, may provide various tabbed features or pages that can be selected by the user, such as a title search tab 94 in the illustrated embodiment. In a current version of this page, a title field 96 is provided that allows the user to input a desired title, such as a movie, television episode, audio/visual presentation, and so forth. Other metadata fields or selection boxes may be provided as indicated by reference numeral 98 in FIG. 7. A result of the query performed by the user would be presented in a search results field as indicated generally by reference numeral 100. In the present embodiment illustrated, multiple titles may appear with an indication of such information as the generation, the production number, the version, and so forth. The user may then select one or more of these located products for further refinement.

FIG. 8 represents a product selection page in a presently contemplated embodiment of the interface. This page, designated by reference numeral 102 will be based upon the title selected from the previous page. A number of exemplary fields may be provided, such as the product type 104 (e.g., distribution), the element category 106 (e.g., video), and other template data 108 (e.g., video distribution-blank template). Moreover, a wide range of additional options may be offered for particular product, and these may constitute the detailed features that are added to the selected version in the assembly process. In the illustrated embodiment, such fields, generally designated by reference numeral 110, may include the element type, the element sub-category, the type and sub-type, the video standard, the stock type, the display aspect ration, the format, a texted or untexted option, textless features, audio language, color/black and white options, analog/digital audio options, time code types, bit rates, conversion types, and so forth. These and/or additional options may be offered for particular products, and some products may not be available with particular options.

FIG. 9 represents an exemplary source material selection page 112 for use after the products selection. In the illustrated embodiment, inventory titles may be displayed as indicated by reference numeral 114. This may be particular useful for implementations in which ingesting of the source material is performed at the time of order, but where existing inventories may provide for simplified processing. Thus, existing inventory may be displayed and searched for selection. Moreover, the interface may display inventory source material elements as indicated generally by reference numeral 116. Again, these may be used for selections based upon package products already made and available for further distribution.

It should be noted that, while not specifically illustrated, the interface pages may also include further screens for specifying customer information, such as shipping and billing information. The screens may also allow for selection of particular delivery options, such as for delivery on film, video tape, by electronic means, including for specific compression formats, and so forth.

In summary, the foregoing techniques allow for greatly improved processing of creation and delivery of digital content, and very significant reductions in the amount of memory capabilities required for storing the versions that will form the basis for the delivered products. Moreover, the system allows for a gradual implementation by permitting legacy products to be added to the system on an ongoing basis, thus greatly facilitating implementation by large studios, television production houses, and clearing houses that may own or control large volumes of audio/visual content.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for processing audiovisual content, comprising:
    processing a digital unsized master version of the audiovisual content to generate a plurality of sized master versions based upon an instruction set including pan and scan instructions from a digital file, the sized master versions consisting of a letterbox version, a pan and scan version, and a full frame version;
    storing the plurality of sized master versions;
    providing, via a content-provider website, an electronic order template configured to receive order characteristics of an order from a requestor, the order characteristics comprising an indication of a size for the packaged version of the content and an indication of one or more additional options;
    receiving the order characteristics for a packaged version of the content, via the content-provider website;
    determining whether the packaged version of the content, having the order characteristics, is stored in an order inventory;
    when the packaged version is not stored in the order inventory:
        selecting one of the plurality of sized master versions based upon the indication of the size;
        assembling the selected one sized master version with additional content based upon the indication of the one or more additional options into an assembled order; and
        electronically transmitting the assembled order to the requestor; and
    otherwise, when the packaged version of the content is stored in the order inventory, electronically transmitting the assembled order to the requestor without re-assembling the packaged version.

2. The method of claim 1, wherein the digital master version is a full aperture version.

3. The method of claim 2, wherein at least the selected one of the plurality of sized master versions is generated from the full aperture version only after receipt of the order.

4. The method of claim 1, wherein at least the selected one of the plurality of sized master versions is generated from the unsized master version only after receipt of the order.

5. The method of claim 1, comprising generating a plurality of sized master versions for a plurality of sized master versions for a legacy library of audiovisual content prior to receipt of the order.

6. A tangible, non-transitory, machine-readable medium, comprising machine-readable instructions to:
    process a digital unsized version of the audiovisual content to generate a plurality of sized master versions based upon an instruction set including pan and scan instructions from a digital file;
    store the plurality of sized master versions;
    provide, via a content-provider website, an electronic order template configured to receive order characteristics of an order from a requestor, the order characteristics comprising an indication of a size for the packaged version of the content and an indication of one or more additional options;
    receive the order characteristics for a packaged version of the content, via the content-provider website;
    determine whether the packaged version of the content, having the order characteristics, is stored in an order inventory;
    when the packaged version of the content is not stored in the order inventory:
        select one of the plurality of sized master versions based upon the indication of the size;
        assemble the selected master version with additional content based upon the indication of the one or more additional options into an assembled order; and
        electronically transmit the assembled order to the requestor; and
    otherwise, when the packaged version of the content is stored in the order inventory, electronically transmit the assembled order to the requestor without reassembling the packaged version.

7. The machine-readable medium of claim 6, comprising instructions to create the digital unsized version from a non-digital master version, and storing the digital unsized master version on a machine readable medium.

8. The machine-readable medium of claim 6, wherein the digital unsized master version is a high definition full aperture version.

9. The machine-readable medium of claim 8, wherein the sized master versions consist of a letterbox version, a pan and scan version, and a full frame version.

10. The machine-readable medium of claim 8, wherein at least the selected one of the plurality of sized master versions is generated from the unsized version only after receipt of the order.

11. The machine-readable medium of claim 6, comprising generating a plurality of sized master versions for a plurality of digital unsized versions for a legacy library of audiovisual content prior to receipt of the order.

12. The machine-readable medium of claim 6, comprising processing a source file containing pan and scan decisions to obtain the digital file.

13. The machine-readable medium of claim 6, wherein the additional content includes language data.

14. The machine-readable medium of claim 6, wherein the additional content includes subtitle data.

15. A system for processing audiovisual content, comprising:
- a digital unsized version of the audiovisual content stored on a machine readable medium;
- a digital file containing data representative of pan and scan instructions for converting the digital unsized version to a plurality of sized master versions;
- a transcoder configured to apply the pan and scan instructions to convert the digital unsized version to a plurality of sized master versions, the sized master versions consisting of a letterbox version, a pan and scan version, and a full frame version;
- digital storage means configured to store the sized master versions; and
- a processor configured to:
  - provide, via a content-provider website, an electronic order template configured to receive order characteristics of an order from a requestor, the order characteristics comprising an indication of a size for the packaged version of the content and an indication of one or more additional options;
  - receive the order characteristics for a packaged version of the content, via the content-provider website;
  - determine whether the packaged version of the content, having the order characteristics, is stored in an order inventory;
  - when the packaged version is not stored in the order inventory:
    - select one of the plurality of sized master versions based upon the indication of the size;
    - assemble the selected one sized master version with additional content based upon the indication of the one or more additional options into an assembled order; and
    - electronically transmit the assembled order to the requestor; and
  - otherwise, when the packed version is stored in the order inventor, electronically transmit the assembled order to the requestor without reassembling the packaged version.

16. The system of claim 15, wherein the digital unsized version is a full aperture version.

17. The system of claim 16, wherein the digital unsized version comprises a high definition full aperture version.

18. The system of claim 15, comprising a processing system for extracting the pan and scan instructions from a post-production file created upon operator selection of scenes to be used in the sized master versions.

19. The system of claim 15, comprising an order interface configured to receive the order characteristics from customers, and means for assembling a selected one of the sized master versions with additional content for delivery to a customer upon receipt of an order via the order interface.

20. A method for processing audiovisual content, comprising:
(a) ingesting digitized audiovisual content from physical media from a legacy library to create digital master versions of multiple pieces of content;
(b) storing the digital master versions in a machine readable medium;
(c) transcoding the digital master versions to create a set of sized master versions;
(d) storing the set of sized master versions;
(d1) providing, via a content-provider web site, an electronic order template configured to receive order characteristics of an order from a requestor, the order characteristics comprising an indication of a size for the packaged version of the content and an indication of one or more additional options;
(e) receiving the order characteristics for a packaged version of a desired piece of content from the library, via the content-provider web site;
(f) determining whether the desired piece of content has been ingested;
(g) if the desired piece of content has been ingested, assembling a selected master version of the desired piece of content with additional content into an assembled order, the selected master version based upon the indication of the size and the additional content based upon the indication of one or more additional options;
(g1) if the selected master version has been assembled, electronically transmitting the assembled order to the requestor; and
(h) if the desired piece of content has not been ingested, performing steps (a), (b), (c), (d), (dl), (g), and (g1) for the desired piece of content.

21. A method for processing audiovisual content, comprising:
creating a digital unsized master version of the audiovisual content;
storing the digital unsized master version;
providing, via a content-provider website, an electronic order template configured to receive order characteristics of an order from a requestor, the order comprising an indication of a size for the packaged version of the content and an indication of one or more additional options comprising a language option and a subtitle option;
receiving the order characteristics for a packaged version of the content, via the content-provider website;
determine whether the packaged version of the content, having the order characteristics, is stored in an order inventory;
when the packaged version is not stored in the order inventory:
  after receipt of the order characteristics, processing the digital unsized master version to generate one of a plurality of sized master versions based upon an instruction set including pan and scan instructions from a digital file for the indication of the size, the plurality of sized master versions consisting of a letterbox version, a pan and scan version, and a full frame version;
  storing the generated master version;
  assembling the generated master version with additional content based upon the indication of the one or more additional options of the order into an assembled order; and
  electronically transmitting the assembled order to the requestor; and otherwise, when the packaged version of the content is stored in the order inventory, electronically transmitting the assembled order to the requestor without reassembling the packaged version.

\* \* \* \* \*